(12) United States Patent
Nishikawa et al.

(10) Patent No.: US 8,881,878 B2
(45) Date of Patent: Nov. 11, 2014

(54) BRAKE DEVICE FOR MOTORCYCLE

(75) Inventors: Yutaka Nishikawa, Saitama (JP); Makoto Toda, Saitama (JP); Kazuhiko Tani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 97 days.

(21) Appl. No.: 13/311,162

(22) Filed: Dec. 5, 2011

(65) Prior Publication Data

US 2012/0145493 A1 Jun. 14, 2012

(30) Foreign Application Priority Data

Dec. 8, 2010 (JP) ................................. 2010-274025

(51) Int. Cl.
| | |
|---|---|
| *B60T 8/172* | (2006.01) |
| *B60T 11/18* | (2006.01) |
| *B60T 7/04* | (2006.01) |
| *B60T 11/16* | (2006.01) |

(52) U.S. Cl.
CPC ................. *B60T 7/042* (2013.01); *B60T 11/18* (2013.01); *B60T 11/16* (2013.01)
USPC ................................. 188/344; 74/512; 74/560

(58) Field of Classification Search
CPC ......... B60T 8/17; B60T 8/1706; B60T 8/172; B62L 3/04; B62L 3/08; G05G 1/38
USPC ........ 188/151 R, 152, 344, 354; 74/512, 560; 180/218, 219, 223; 60/594
See application file for complete search history.

(56) References Cited

U.S. PATENT DOCUMENTS

| | | | | |
|---|---|---|---|---|
| 4,958,607 | A | * | 9/1990 | Lundberg ........................ 74/512 |
| 6,263,859 | B1 | * | 7/2001 | Kalsi ............................... 74/560 |
| 6,515,473 | B2 | * | 2/2003 | Pfaffenberger et al. ........ 74/512 |
| 6,809,512 | B2 | * | 10/2004 | Pfaffenberger et al. ........ 74/560 |
| 7,857,397 | B2 | * | 12/2010 | Nanri et al. .................... 188/352 |
| 7,870,924 | B2 | * | 1/2011 | Fujita et al. ................... 180/219 |
| 8,235,157 | B2 | * | 8/2012 | Cheng et al. .................. 180/219 |
| 2005/0247158 | A1 | * | 11/2005 | Willemsen et al. ............. 74/513 |
| 2010/0243359 | A1 | * | 9/2010 | Cheng et al. .................. 180/219 |

FOREIGN PATENT DOCUMENTS

| | | | | |
|---|---|---|---|---|
| JP | 03118261 | A | * | 5/1991 |
| JP | 04287786 | A | * | 10/1992 |
| JP | 09-164925 | A |  | 6/1997 |

* cited by examiner

*Primary Examiner* — Thomas J Williams
(74) *Attorney, Agent, or Firm* — Birch Stewart Kolasch & Birch, LLP

(57) ABSTRACT

A brake device for a vehicle includes a brake pedal rotatably supported on a support shaft and extending in a front ward direction from the support shaft in the longitudinal direction of the vehicle. A master cylinder is located on the rear side of the support shaft in the longitudinal direction of the vehicle for generating a braking hydraulic pressure according to the rotational operation of the brake pedal. An operational amount detector is mechanically connected to the brake pedal for detecting the rotational amount of the brake pedal. The master cylinder includes an axis that is arranged vertically and is located above the support shaft with the operational amount detector being located on the rear side of the support shaft in the longitudinal direction of the motorcycle. Thus, the master cylinder and the operational amount detector can be densely arranged in the longitudinal direction of the vehicle.

20 Claims, 8 Drawing Sheets

LEFT (INSIDE) ←——→ RIGHT (OUTSIDE)

BRAKE DEVICE FOR MOTORCYCLE

CROSS-REFERENCE TO RELATED APPLICATIONS

The present application claims priority under 35 USC 119 to Japanese Patent Application No. 2010-274025 filed on Dec. 8, 2010 the entire contents of which are hereby incorporated by reference.

BACKGROUND OF THE INVENTION

1. Field of the Invention

The present invention relates to a brake device for a motorcycle including a brake pedal, a master cylinder, and an operational amount detector for detecting the rotational amount of the brake pedal.

2. Description of Background Art

A technique is known wherein a potentiometer is used to obtain the operational amount of a brake pedal to provide control information for an ABS (Antilock Brake System). See, for example, FIGS. 1 and 2 of Japanese Patent Laid-Open No. Hei 9-164925.

As shown in FIG. 1 of Japanese Patent Laid-Open No. Hei 9-164925, a potentiometer (60) (the numbers in parentheses are the same as the numbers shown in Japanese Patent Laid-Open No. Hei 9-164925) and a brake pedal (40) are mounted on a bracket (30). An arm (70) extends from the brake pedal (40) to the potentiometer (60). The arm (70) is rotatable with the brake pedal (40).

As shown in FIG. 2 of Japanese Patent Laid-Open No. Hei 9-164925, a pin (71) is mounted at the front end of the arm (70). The pin (71) is engaged with a bifurcated arm (63a) extending from the potentiometer (60), so that the operational amount of the brake pedal (40) can be detected by the potentiometer (60).

In the case of applying the arrangement of the potentiometer (60) shown in Japanese Patent Laid-Open No. Hei 9-164925 to a motorcycle, the operational direction (rotational direction) of the brake pedal is changed from a longitudinal direction to a vertical direction, so that the layout of parts in the periphery of the brake pedal is susceptible to limitation.

Further, if the potentiometer (60), the brake pedal (40), and an input rod (21) are provided in a motorcycle without any changes, the potentiometer (60) and the input rod (21) are located directly below the brake pedal (40), so that it is difficult to ensure a road clearance.

SUMMARY AND OBJECTS OF THE INVENTION

It is accordingly an object of an embodiment of the present invention to provide a brake device for a motorcycle having a potentiometer that can suppress the limitation of layout of other members and can easily ensure a necessary road clearance.

It is accordingly an object of an embodiment of the present invention to provide a brake device for a motorcycle having a potentiometer that can suppress the limitation of layout of other members and can easily ensure a necessary road clearance. In accordance with an embodiment of the invention, there is provided a brake device for a motorcycle including a support shaft, a brake pedal rotatably supported to the support shaft and extending to the front from the support shaft in the longitudinal direction of the motorcycle, a master cylinder located on the rear side of the support shaft in the longitudinal direction of the motorcycle for generating a braking hydraulic pressure according to the rotational operation of the brake pedal, and an operational amount detector mechanically connected to the brake pedal for detecting the rotational amount of the brake pedal; wherein the master cylinder is located above the support shaft in such a manner that the axis of the master cylinder extends vertically, and the operational amount detector is located on the rear side of the support shaft in the longitudinal direction of the motorcycle.

In accordance with an embodiment of the present invention, the brake device further includes a support plate mounted on a vehicle body of the motorcycle, wherein a foot step is provided on the support plate so as to extend from the support plate in the laterally outward direction of the motorcycle, and the operational amount detector is provided on the lateral inside of the support plate.

In accordance with an embodiment of the present invention, the operational amount detector includes a potentiometer, and the support plate has a lower extending portion projecting downward from the lowermost end of the potentiometer.

In accordance with an embodiment of the present invention, the support shaft is supported to the support plate with a boss portion of the brake pedal being rotatably mounted on the support shaft. A first gear extends from the boss portion along the laterally inside surface of the support plate with a second gear meshing with the first gear being connected to an input shaft of the potentiometer. An inner cover is provided for covering the first gear and the second gear and is mounted on the laterally inside surface of the support plate.

In accordance with an embodiment of the present invention, the support plate has an upper extending portion, and the master cylinder is mounted on the upper extending portion of the support plate.

According to an embodiment of the present invention, the master cylinder is located above the support shaft in such a manner that the axis of the master cylinder extends vertically. If the master cylinder extends in the longitudinal direction of the vehicle or obliquely, a space cannot be ensured on the rear side of the master cylinder, causing an influence on the location of equipment.

In this respect, the present invention has an advantage such that the master cylinder is vertically positioned and a space can therefore be ensured on the rear side of the master cylinder. The operational amount detector is located in this space. Thus, the master cylinder and the operational amount detector can be densely arranged in the longitudinal direction of the vehicle. Accordingly, it is possible to provide a brake device for a motorcycle having a potentiometer which can suppress the limitation of layout of other members and can easily ensure a necessary road clearance.

Further, the space for vertically positioning the master cylinder can be ensured in the vicinity of the brake pedal where a plurality of pieces of equipment are arranged, by slightly displacing these pieces of equipment in the longitudinal direction of the vehicle. More specifically, the master cylinder can be located without any influence on the equipment provided near the brake pedal.

According to an embodiment of the present invention, the operational amount detector is provided on the lateral inside of the support plate for also supporting the foot step. Accordingly, the support plate functions as a protective cover for protecting the operational amount detector.

According to an embodiment of the present invention, the operational amount detector includes a potentiometer, and the support plate has a lower extending portion projecting downward from the lowermost end of the potentiometer. Accordingly, bouncing stones from the ground come into collision with the lower extending portion. More specifically, the potentiometer is also protected by the lower extending portion.

According to an embodiment of the present invention, the first gear and the second gear for transmitting the operational amount of the brake pedal to the operational amount detector are stored in a sealed case formed by the support plate and the inner cover.

Thus, the first gear and the second gear are stored in the sealed case, thereby ensuring a waterproof performance in the brake device.

Further, the support plate doubles as most of the sealed case, so that a compact and lightweight brake device for a motorcycle can be provided.

According to an embodiment of the present invention, the master cylinder is mounted on the upper extending portion of the support plate. Accordingly, all of the master cylinder, the foot step, the brake pedal, and the operational amount detector can be preliminarily mounted on the support plate to form an assembly, and this assembly can be mounted on a vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
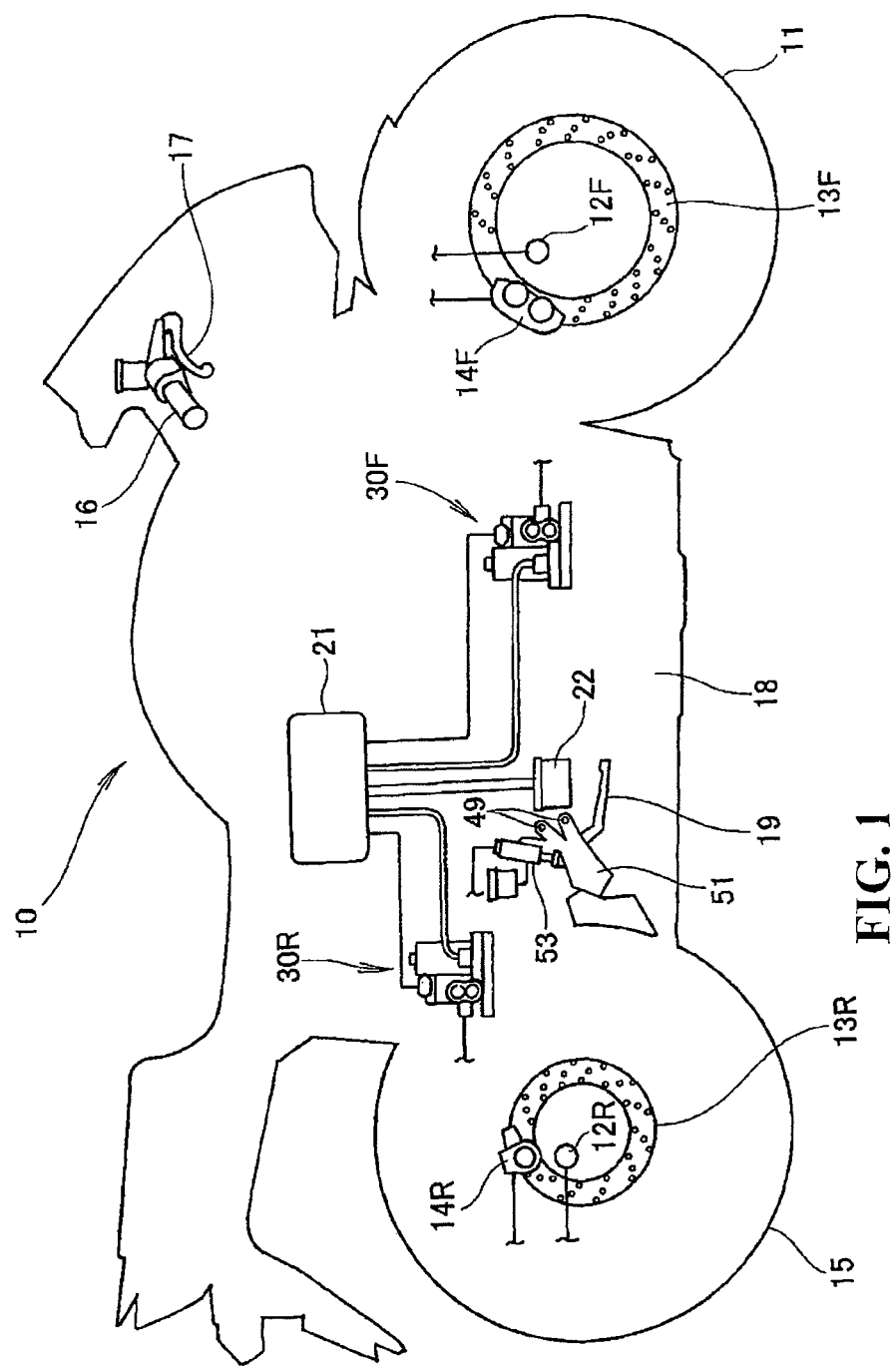
FIG. 1 is a schematic side view of a motorcycle including a brake device according to the present invention.

A mode for carrying out the present invention will now be described with reference to the attached drawings. The orientation of each drawing is the same as that of the reference numerals included therein.

As shown in FIG. 1, a motorcycle 10 includes a front wheel 11, a rear wheel 15, a steering handle 16, and a vehicle body 18. A front wheel speed sensor 12F (F means the front side of the vehicle, and the same applies to the following), a brake disc 13F and a brake caliper 14F are provided in the vicinity of the front wheel 11. A rear wheel speed sensor 12R (R means the rear side of the vehicle, and the same applies to the following), a brake disc 13R and a brake caliper 14R are provided in the vicinity of the rear wheel 15. A brake lever 17 to be operated by an operator's hand is provided on the steering handle 16. A brake pedal 19 to be operated by an operator's foot is provided at a lower central portion of the vehicle body 18. Hydraulic modulators 30F and 30R for adjusting a hydraulic pressure to be sent to the brake calipers 14F and 14R are provided on the vehicle body 18. A controller 21 and a battery 22 are provided on the vehicle body 18.

Figure 2:
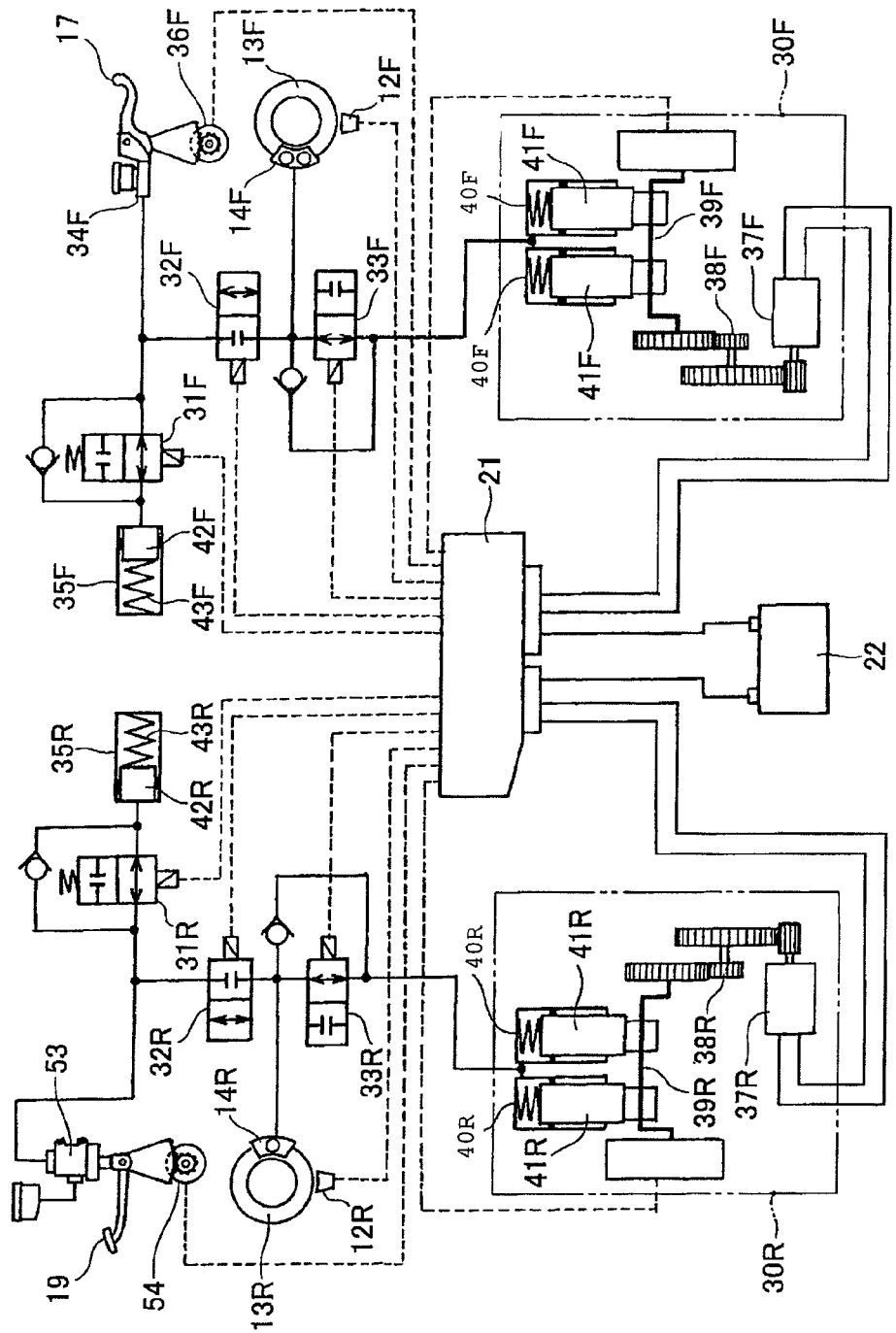
FIG. 2 is a diagram for illustrating a brake system in a motorcycle shown in FIG. 1.

The mutual relation and operation of these components will now be described with reference to FIG. 2.

For ease of illustration, a front wheel braking system in a noncombination mode will now be described.

Front wheel braking is performed so as to select any one of a first mode where the rotational speed of the front wheel is zero or not greater than a predetermined value, a second mode where the rotational speed of the front wheel is greater than the predetermined value and the operational amount of the brake lever is not greater than a predetermined value, and a third mode where the rotational speed of the front wheel is greater than the predetermined value and the operational amount of the brake lever is greater than the predetermined value.

The first to third modes mentioned above will now be described in sequence with reference to FIG. 2.

First Mode:

Speed information obtained by the front wheel speed sensor 12F is sent to the controller 21. When the front wheel speed is determined to be less than or equal to the predetermined value, the controller 21 keeps closing a first solenoid valve 31F (normally closed), opening a second solenoid valve 32F (normally open), and closing a third solenoid valve 33F (normally closed). When the brake lever 17 is operated, a hydraulic pressure is generated in a master cylinder 34F and it is transmitted to the brake caliper 14F. Accordingly, in a rest condition of the vehicle or during operation at very low speeds, each solenoid is not energized and an energy saving can therefore be expected. The brake caliper 14F operates to brake the brake disc 13F. The first mode is also applied in the case wherein a main switch is OFF.

When the normally closed solenoid becomes abnormal, it is maintained in a normally closed condition by the push force of a spring, whereas when the normally open solenoid becomes abnormal, it is maintained in a normally open condition by the push force of a spring.

Second Mode:

Speed information obtained by the front wheel speed sensor 12F is sent to the controller 21. When the front wheel speed is determined to be greater than the predetermined value, the controller 21 opens the first solenoid valve 31F. The second solenoid valve 32F is maintained open and the third solenoid valve 33F is maintained closed. The second mode is a standby mode prior to so-called BBW (the third mode).

Third Mode:

Speed information obtained by the front wheel speed sensor 12F is sent to the controller 21. Further, operational amount information obtained by an operational amount detector 36F is sent to the controller 21. When the front wheel speed is determined to be greater than the predetermined value and the operational amount is determined to be greater than the predetermined value, the controller 21 keeps opening the first solenoid valve 31F, closes the second solenoid valve 32F, and opens the third solenoid valve 33F.

Since the second solenoid valve 32F is closed, the hydraulic pressure generated in the master cylinder 34F is not transmitted to the brake caliper 14F. Instead of the operation of the master cylinder 34F, the controller 21 operates the hydraulic modulator 30F. More specifically, the controller 21 starts a motor 37F to rotate a camshaft 39F through a reduction gear mechanism 38F, thereby advancing pistons 41F of master cylinders 40F. A hydraulic pressure generated in the master cylinders 40F is transmitted through the third solenoid valve 33F to the brake caliper 14F. The brake caliper 14F operates to brake the brake disc 13F.

The hydraulic pressure generated in the master cylinder 34F is applied to a stroke simulator 35F because the first solenoid valve 31F is open. The stroke simulator 35F operates in such a manner that a piston 42F is moved against a spring 43F according to the hydraulic pressure applied, so that the volume in an oil passage is increased. As a result, "play" is given to the brake lever 17. That is, an operation feel of the brake lever 17 is maintained.

The operational amount of the brake lever 17 is converted into an electrical signal, which is in turn sent through a wire to the controller 21. Then, the controller 21 controls the hydraulic modulator 30F through a wire. Thus, the hydraulic modulator 30F is controlled through the wires, so that this control system is referred to as a by-wire type brake system (brake-by-wire; BBW).

The first to third modes mentioned above are similarly applied to the rear wheel 15 and the brake pedal 19. A master cylinder 53 and an operational amount detector 54 are provided in relation to the brake pedal 19. The related components are affixed by the symbol R instead of the symbol F. The configuration and operation of these related components are the same as those of the components for the front wheel 11, so the description thereof will be omitted herein.

In the braking system, combination braking and ABS operation are also performed.

The combination braking is performed in such a manner that when the brake lever 17 is operated, the front wheel 11 and the rear wheel 15 are both braked at a given braking ratio irrespective of the operation of the brake pedal 19. This control is performed by the controller 21.

Further, the difference between a vehicle speed and a rotational speed of the rear wheel is detected. When this difference is increased and the occurrence of slip of the rear wheel is therefore expected, a braking force applied to the rear wheel is reduced to prevent the occurrence of slip of the rear wheel. This control is similarly applied to the front wheel.

This control operation is referred to as ABS operation. More specifically, the controller 21 operates to return a camshaft 39R and to thereby retract pistons 41R, thus performing the ABS operation.

The present invention relates to a brake device 50 including the brake pedal 19 as an operating member. The detailed structure of this brake device 50 will now be described with reference to FIGS. 3 to 5.

Figure 3:
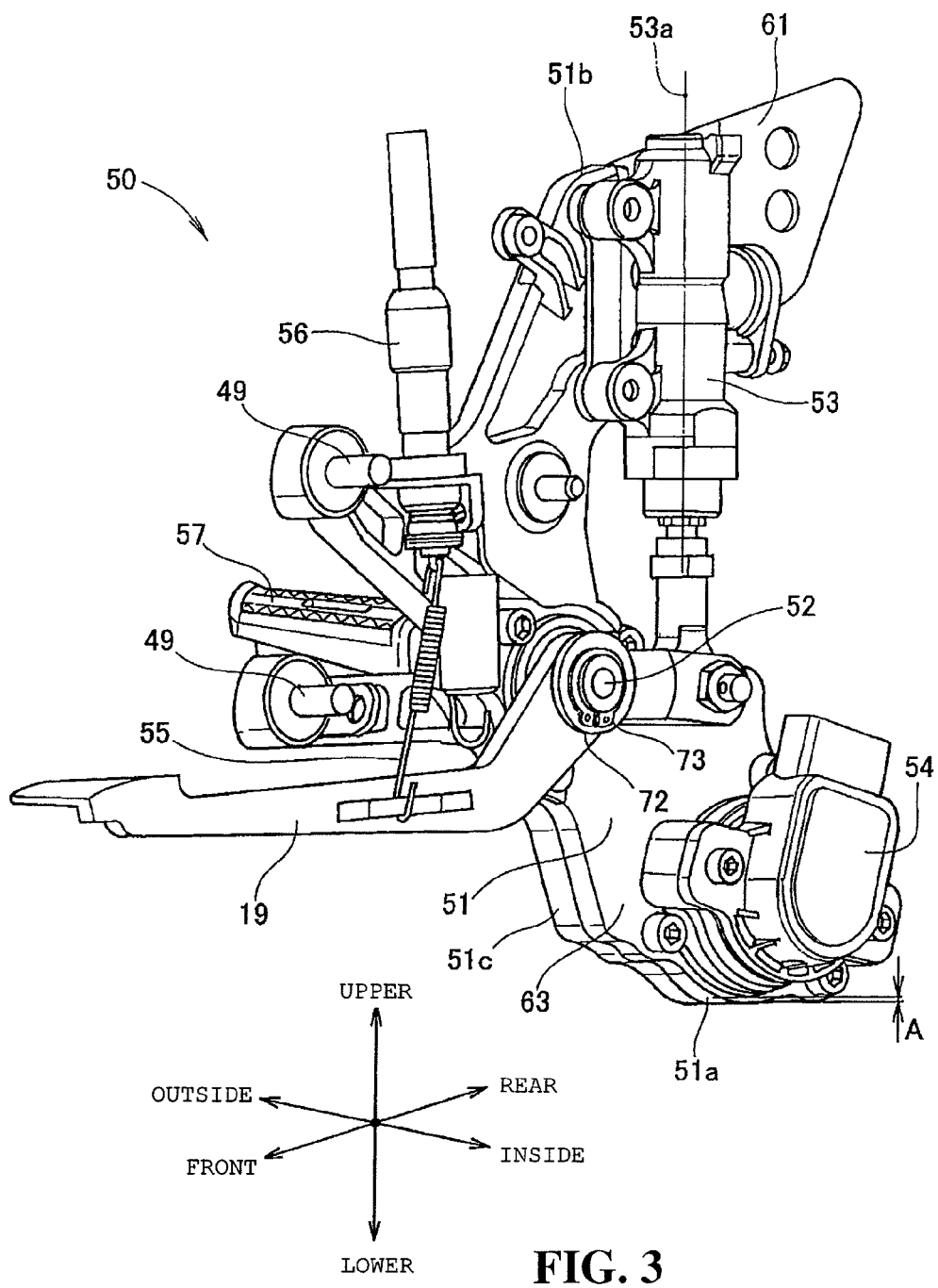
FIG. 3 is a perspective view of the brake device according to the present invention as viewed from the lateral inside of the brake device in the lateral direction of the vehicle.

FIG. 3 is a perspective view of the brake device 50 as viewed from the lateral inside thereof in the lateral direction of the vehicle. As shown by the directional signs at the lower position in FIG. 3, the left downward direction in FIG. 3 denotes the front side of the brake device 50 in the longitudinal direction of the vehicle, the rightward direction in FIG. 3 denotes the lateral inside of the brake device 50 in the lateral direction of the vehicle, and the leftward direction in FIG. 3 denotes the lateral outside of the brake device 50 in the lateral direction of the vehicle.

As shown in FIG. 3, the brake device 50 includes a support plate 51 mounted to the vehicle body 18 (see FIG. 1) by a plurality of bolts 49, a seesaw type brake pedal 19 is vertically swingably supported through a support shaft 52 to the support plate 51 on the lateral inside thereof so as to extend in a forward direction from the support shaft 52 in the longitudinal direction of the vehicle. A master cylinder 53 is connected to the brake pedal 19 on the rear side of the support shaft 52 in the longitudinal direction of the vehicle for generating pressure oil with an operational amount detector 54 being mounted on the lateral inside of the support plate 51 on the rear side of the support shaft 52 in the longitudinal direction of the vehicle for detecting the operational amount of the brake pedal 19. A stop lamp switch 56 is mounted on the lateral inside of the support plate 51 and is connected through a spring 55 to the brake pedal 19 for generating a lighting signal for a stop lamp upon operation of the brake pedal 19.

When the brake pedal 19 is depressed by the operator, it is rotated counterclockwise as viewed in FIG. 3. As a result, the lighting signal is generated from the stop lamp switch 56. At the same time, the master cylinder 53 is operated to compress its piston, thereby generating pressure oil.

As is apparent from FIG. 3, the master cylinder 53 is located above the support shaft 52 in such a manner that the axis 53a of the master cylinder 53 extends vertically. If the master cylinder 53 extends in the longitudinal direction of the vehicle or obliquely, a space cannot be ensured on the rear side of the master cylinder 53, causing an influence on the location of various equipment.

In this respect, the present invention has an advantage such that the master cylinder 53 is vertically positioned and a space can therefore be ensured on the rear side of the master cylinder 53. The operational amount detector 54 is located in this space. Thus, the master cylinder 53 and the operational amount detector 54 can be densely arranged in the longitudinal direction of the vehicle.

The operational amount detector 54 for detecting the operational amount of the brake pedal 19 may be provided by a potentiometer, a rotary encoder, or various rotary switches. Of these detectors, a potentiometer is composed of a fixed conductor, a moving conductor, leads, and a case, so it is preferable because of its simple structure and low cost. Therefore, a potentiometer is adopted as the operational amount detector 54 in this preferred embodiment. The operational amount detector 54 will be hereinafter referred to as the potentiometer 54.

The support plate 51 extends vertically and has a lower extending portion 51a projecting downwardly from the lowermost end of the potentiometer 54 by a distance A. Accordingly, bouncing stones from the ground come into collision with the lower extending portion 51a. More specifically, the potentiometer 54 is protected by the lower extending portion 51a.

Figure 4:
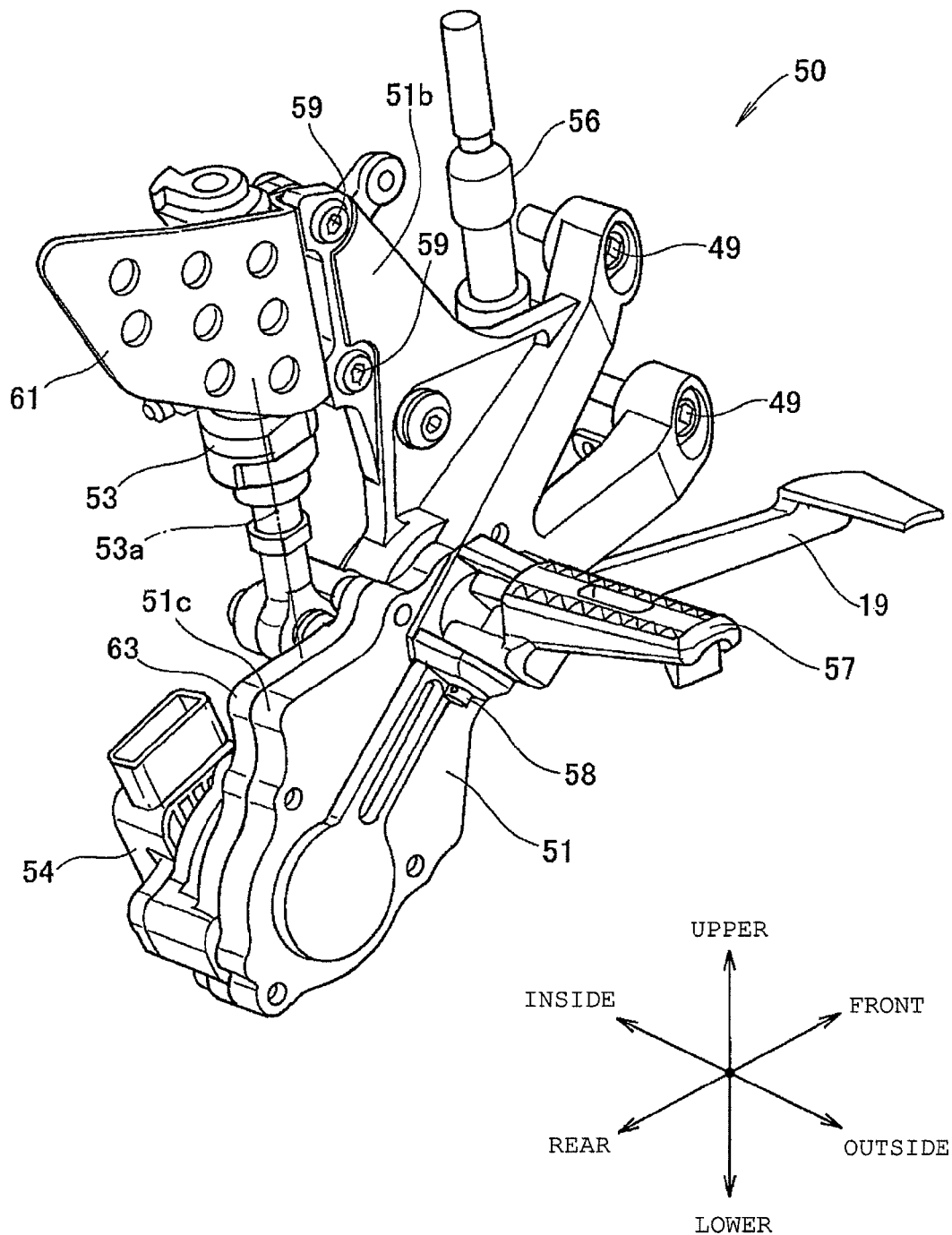
FIG. 4 is a perspective view of the brake device for a motorcycle according to the present invention as viewed from the lateral outside of the brake device in the lateral direction of the vehicle.

As shown in FIG. 4, a perspective view of the brake device 50 as viewed from the lateral outside thereof in the lateral direction of the vehicle, a foot step 57 is mounted on the lateral outside of the support plate 51 so as to extend outward in the lateral direction of the vehicle. The foot step 57 is pivotably mounted through a pin 58 so as to be selectively positioned in a horizontal condition (operational condition) and in a condition (non-operational condition) rotated 90° about the pin 58 from the horizontal condition.

The potentiometer 54 is provided on the lateral inside of the support plate 51 which is also supporting the foot step 57.

Accordingly, the support plate 51 functions as a protective cover for protecting the potentiometer 54.

The support plate 51 also has a triangular upper extending portion 51*b*. The master cylinder 53 is mounted through two bolts 59, 59 to the upper extending portion 51*b* of the support plate 51. Preferably, a cylinder cover 61 formed by bending a porous plate is sandwiched between the upper extending portion 51*b* and the master cylinder 53 and fastened by the bolts 59, 59.

Thus, the cylinder cover 61 is fastened to the support plate 51 by the common bolts 59 for fastening the master cylinder 53, thereby reducing the number of fastening bolts.

Further, the master cylinder 53 can be protected by the cylinder cover 61. More specifically, it is unnecessary to completely cover the lateral outside of the master cylinder 53 by using the upper extending portion 51*b*. Accordingly, the upper extending portion 51*b* can be reduced in size.

The sectional structure of the support plate 51 shown in FIG. 4 will now be described with reference to FIG. 5.

Figure 5:
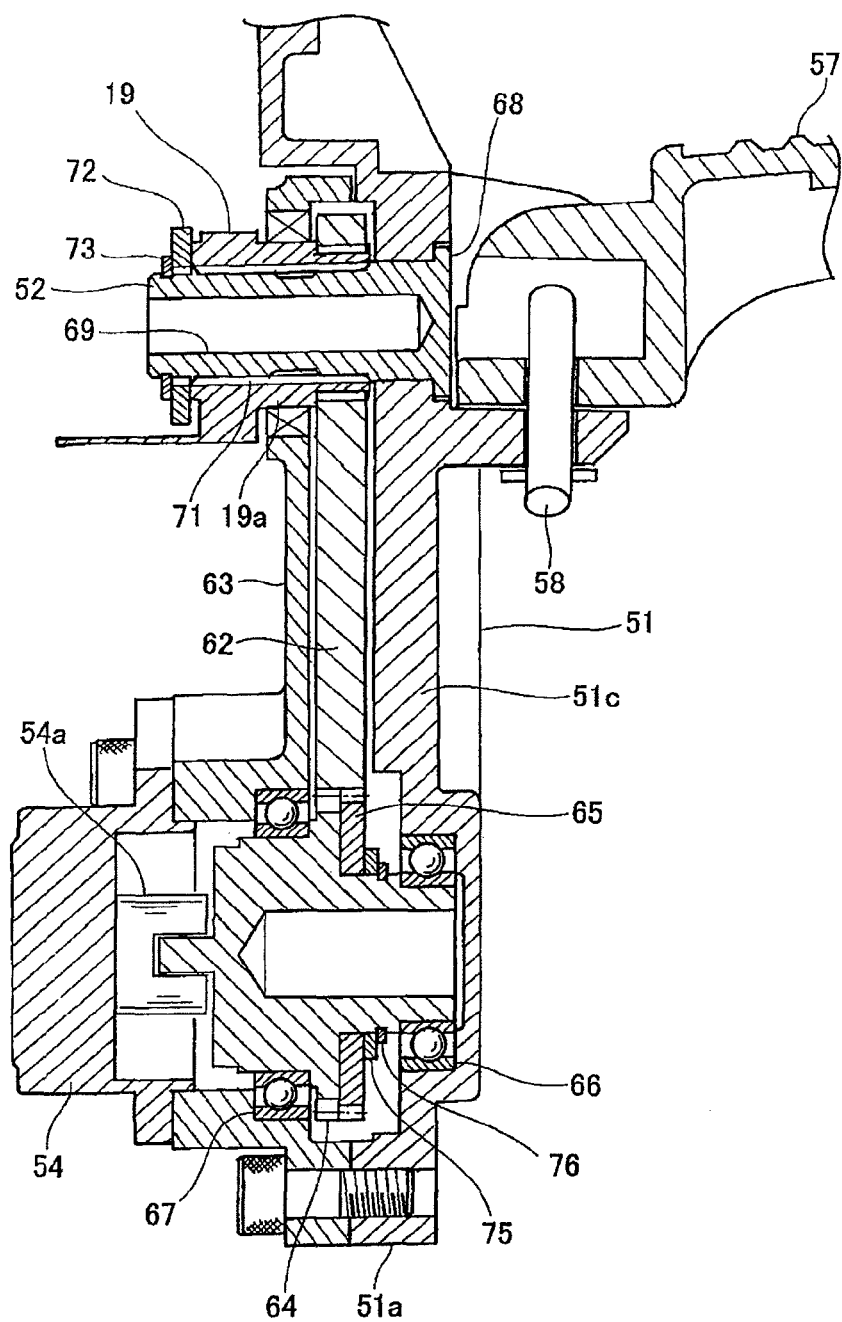
FIG. 5 is a sectional view of an essential part of the brake device for a motorcycle.

As shown in FIG. 5, the support shaft 52 is supported to the support plate 51, and a boss portion 19*a* of the brake pedal 19 is supported to the support shaft 52. A first gear 62 is engaged with the boss portion 19*a*. The first gear 62 extends along the lateral inside surface of the support plate 51. The first gear 62 is preferably provided by a sector gear.

The support plate 51 has a plate body portion 51*c* extending from the support shaft 52 to the lower extending portion 51*a*, and an inner cover 63 is joined to the inside surface of the plate body portion 51*c* so as to define a space for storing the first gear 62.

A third gear 64 is mounted to the lower extending portion 51*a* of the support plate 51, and a second gear 65 is mounted to the third gear 64. The second gear 65 is rotated by the first gear 62.

The third gear 64 is supported through a bearing 66 to the plate body portion 51*c* and also supported through a bearing 67 to the inner cover 63.

The potentiometer 54 is mounted on the inner cover 63. An input shaft 54*a* extends laterally outwardly from the potentiometer 54, and one end of the third gear 64 is engaged with the input shaft 54*a*, thereby mechanically connecting the second gear 65 and the third gear 64 to the input shaft 54*a* of the potentiometer 54.

The number of teeth of the third gear 64 is smaller by one than that of the second gear 65. The distance between the axis of rotation of the first gear 62 and the axis of rotation of the second gear 65 is equal to the distance between the axis of rotation of the first gear 62 and the axis of rotation of the third gear 64. The second gear 65 and a wave washer 75 are fitted on a shaft portion of the third gear 64 and axially fixed by a C-shaped clip 76.

The wave washer 75 is fixed in the condition that it is pressed and deformed by the C-shaped clip 76, thereby pressing the second gear 65 on the third gear 64.

When the first gear 62 is mounted in this condition, the second gear 65 and the third gear 64 mesh with the first gear 62. Accordingly, the backlash between the gears becomes zero, so that the detection accuracy of the operational amount detector 54 can be improved.

The first gear 62 and the second gear 65 are stored in a sealed case formed by the plate body portion 51*c* and the inner cover 63, thereby ensuring a waterproof performance.

Further, the support plate 51 doubles as most of the sealed case (the plate body portion 51*c*), so that a compact and lightweight brake device for a motorcycle can be provided.

The structure of the support shaft 52 is arbitrary. In this preferred embodiment, a flanged hollow shaft is adopted as the support shaft 52. The flanged hollow shaft is a round rod with a flange 68 at one end thereof. From the other end of the flanged hollow shaft, a lightening hole 69 is formed by using a drill for weight reduction.

The support shaft 52 is inserted through the plate body portion 51*c* from its lateral outside in such a manner that the flange 68 is engaged with a recess formed on the lateral outside surface of the plate body portion 51*c*.

The support shaft 52 may be a rotating shaft or a non-rotating shaft.

In the case of a rotating shaft, the boss portion 19*a* of the brake pedal 19 is fitted through a spline 71 to the support shaft 52. A washer 72 and a C-shaped snap ring 73 are fitted to one end of the support shaft 52 (opposite to the flange 68), so as to prevent the axial movement of the boss portion 19*a*.

In the case of a non-rotating shaft, the spline 71 is replaced by a bearing metal mounted on the support shaft 52, and the boss portion 19*a* is slidable on the bearing metal.

By forming the flange 68, the axial movement of the support shaft 52 toward the lateral inside can be limited. After mounting the support shaft 52, the foot step 57 is mounted to the plate body portion 51*c* through the pin 58. The axial movement of the support shaft 52 toward the lateral outside is prevented by the C-shaped snap ring 73. The foot step 57 also functions to subsidiarily prevent the axial movement of the support shaft 52 toward the lateral outside.

As shown in FIGS. 3 and 4, the support shaft 52, the brake pedal 19, the master cylinder 53, the potentiometer 54, the spring 55, the stop lamp switch 56, the foot step 57, the cylinder cover 61, the first gear 62 (see FIG. 5), the third gear 64 (see FIG. 5), and the second gear 65 (see FIG. 5) are preliminarily mounted to the support plate 51 having the lower extending portion 51*a* and the upper extending portion 51*b*. The brake device 50 according to this preferred embodiment is an assembly of all the above, and the assembly can be mounted to the vehicle body 18 (see FIG. 1).

In an assembly line for the motorcycle 10, the brake device 50 thus assembled can be mounted to the vehicle body 18. Accordingly, the number of man-hours for assembly in the assembly line can be greatly reduced.

Figure 6:
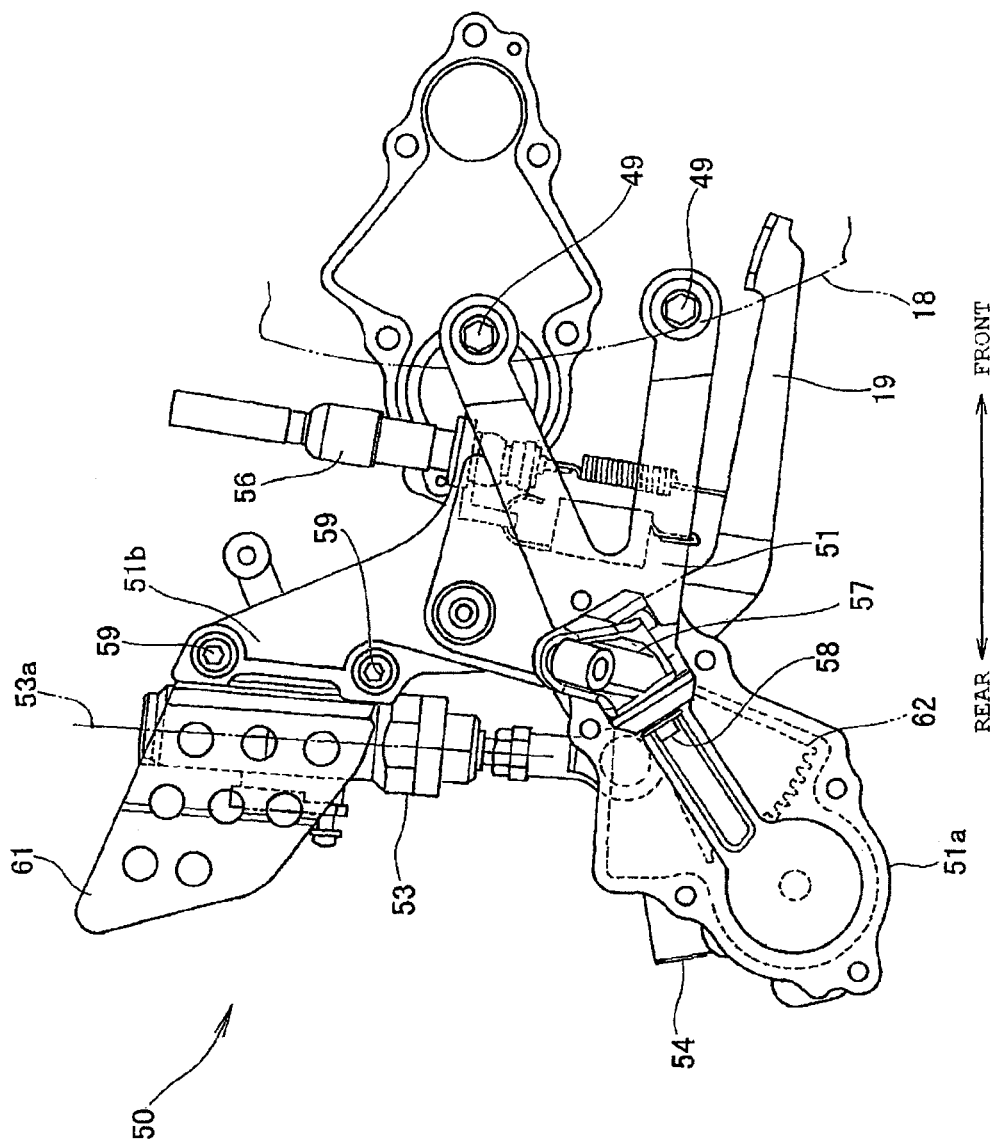
FIG. 6 is a front elevation view of the brake device for a motorcycle according to the present invention as viewed from the lateral outside thereof in the lateral direction of the vehicle.

The mutual relation of the components of the brake device 50 for a motorcycle will now be described with reference to FIGS. 6 and 7. FIG. 6 is a front elevation of the brake device 50 as viewed from the lateral outside thereof in the lateral direction of the vehicle, and FIG. 7 is a rear elevation of the brake device 50 as viewed from the lateral inside thereof in the lateral direction of the vehicle.

As shown in FIG. 6, the support plate 51 is fixed to the vehicle body (body frame) 18 by the bolts 49, 49. The support plate 51 has the lower extending portion 51*a* extending obliquely downwardly in the rearward direction of the vehicle and the upper extending portion 51*b*. The first gear 62 having a sectorial shape is accommodated in the lower extending portion 51*a*. The master cylinder 53 and the cylinder cover 61 are fastened to the upper extending portion 51*b* by the common bolts 59, 59.

Figure 7:
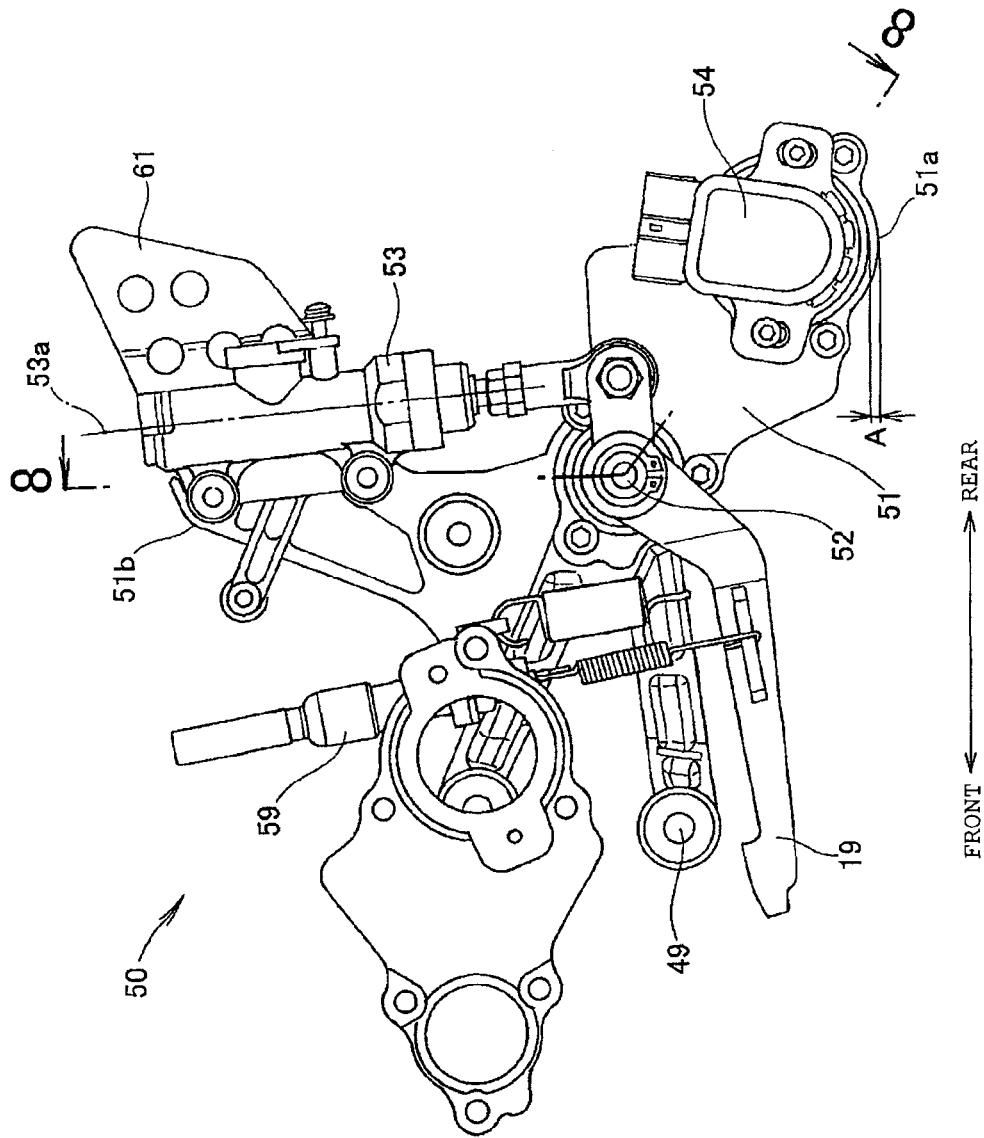
FIG. 7 is a rear elevation view of the brake device for a motorcycle as viewed from the lateral inside thereof in the lateral direction of the vehicle.

As shown in FIG. 7 as a rear elevation of FIG. 6, the brake pedal 19 extends from the support shaft 52 in the frontward direction of the vehicle. The master cylinder 53 is located above the support shaft 52 in such a manner that the axis 53*a* of the master cylinder 53 extends vertically. The operational amount detector 54 is located on the rear side of the support shaft 52 in the longitudinal direction of the vehicle (the brake pedal 19 being located on the front side of the support shaft 52 as viewed in FIG. 7). The lower extending portion 51*a* of the support plate 51 projects downward from the lowermost end of the potentiometer 54 by the distance A.

Figure 8:
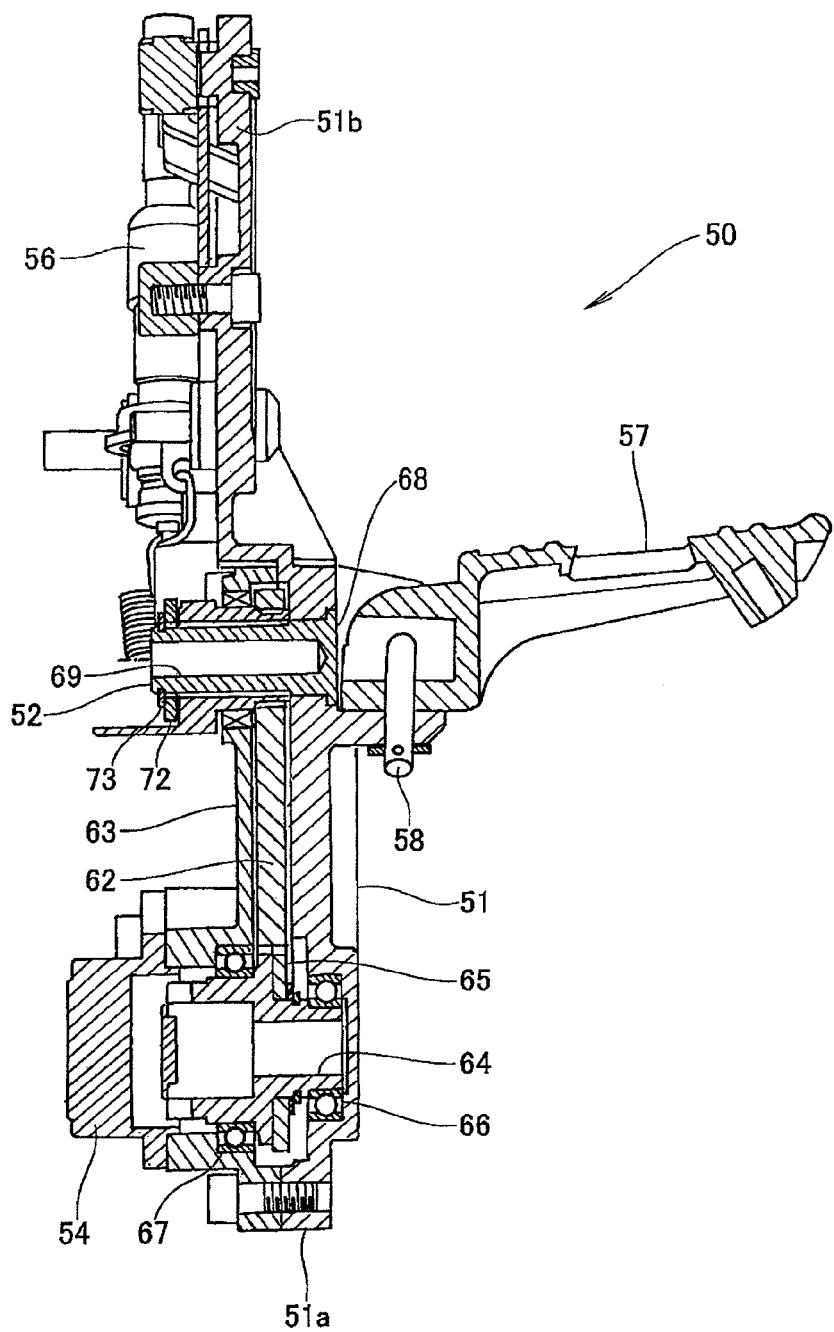
FIG. 8 is a cross section taken along the line 8-8 in FIG. 7.

As shown in FIG. 8, the foot step 57 extends from the support plate 51 to the lateral outside thereof. The operational amount detector 54 is provided on the lateral inside of the support plate 51.

The support plate 51 extends vertically in such a manner that the support shaft 52 is located at the substantially central position in the vertical direction. The first gear 62 and the second gear 65 are accommodated in and in the vicinity of the lower extending portion 51a.

The present invention is suitable for a rear brake device for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake device for a vehicle comprising:
   a support shaft;
   a brake pedal rotatably supported on said support shaft and extending in a forward direction from said support shaft in a longitudinal direction of said vehicle;
   a master cylinder located on a rear side of said support shaft in the longitudinal direction of said vehicle for generating a braking hydraulic pressure according to the rotational operation of said brake pedal;
   a support plate mounted on a vehicle body of said vehicle;
   a foot step provided on said support plate; and
   an operational amount detector mechanically connected to said brake pedal and detecting how much rotational amount of said brake pedal is made by the rotational operation of said brake pedal,
   wherein said master cylinder is located above said support shaft wherein an axis of said master cylinder extends vertically, and
   said operational amount detector is located on the rear side of said support shaft in the longitudinal direction of said vehicle, and said operational amount detector is provided on said support plate.

2. The brake device for a vehicle according to claim 1,
   wherein the food step extends from said support plate in a laterally outward direction of said vehicle, and
   said operational amount detector is provided on a lateral inside of said support plate.

3. The brake device for a vehicle according to claim 2,
   wherein said operational amount detector is a potentiometer, and
   said support plate has a lower extending portion projecting downward from the lowermost end of said potentiometer.

4. The brake device for a vehicle according to claim 3,
   wherein said support shaft is supported on said support plate,
   a boss portion of said brake pedal is rotatably mounted on said support shaft,
   a first gear extends from said boss portion along the laterally inside surface of said support plate,
   a second gear meshing with said first gear is connected to an input shaft of said potentiometer, and
   an inner cover for covering said first gear and said second gear is mounted on the laterally inside surface of said support plate.

5. The brake device for a vehicle according to claim 2,
   wherein said support plate has an upper extending portion, and
   said master cylinder is mounted on said upper extending portion of said support plate.

6. The brake device for a vehicle according to claim 3,
   wherein said support plate has an upper extending portion, and
   said master cylinder is mounted on said upper extending portion of said support plate.

7. The brake device for a vehicle according to claim 4,
   wherein said support plate has an upper extending portion, and
   said master cylinder is mounted on said upper extending portion of said support plate.

8. A brake device for a vehicle comprising:
   a support shaft;
   a brake pedal extending forwardly and being operatively connected to the support shaft;
   a master cylinder located on a rear side of said support shaft for generating a braking hydraulic pressure according to the rotational operation of said brake pedal;
   a support plate mounted on a vehicle body of said vehicle;
   a foot step provided on said support plate; and
   an operational amount detector mechanically connected to said brake pedal and detecting how much rotational amount of said brake pedal is made by the rotational operation of said brake pedal,
   wherein said master cylinder is located above said support shaft wherein an axis of said master cylinder extends vertically, and
   said operational amount detector is located on the rear side of said support shaft, and said operational amount detector is provided on said support plate.

9. The brake device for a vehicle according to claim 8,
   wherein the food step extends from said support plate, and
   said operational amount detector is provided on a lateral inside of said support plate.

10. The brake device for a vehicle according to claim 9,
    wherein said operational amount detector is a potentiometer, and
    said support plate has a lower extending portion projecting downwardly from the lowermost end of said potentiometer.

11. The brake device for a vehicle according to claim 10,
    wherein said support shaft is supported on said support plate,
    a boss portion of said brake pedal is rotatably mounted on said support shaft,
    a first gear extends from said boss portion along the laterally inside surface of said support plate,
    a second gear meshing with said first gear is connected to an input shaft of said potentiometer, and
    an inner cover for covering said first gear and said second gear is mounted on the laterally inside surface of said support plate.

12. The brake device for a vehicle according to claim 9,
    wherein said support plate has an upper extending portion, and
    said master cylinder is mounted on said upper extending portion of said support plate.

13. The brake device for a vehicle according to claim 10,
    wherein said support plate has an upper extending portion, and
    said master cylinder is mounted on said upper extending portion of said support plate.

14. The brake device for a vehicle according to claim 11,
    wherein said support plate has an upper extending portion, and said master cylinder is mounted on said upper extending portion of said support plate.

15. A brake device comprising:
   a support shaft;
   a brake pedal operatively mounted relative to said support shaft;
   a master cylinder located on a first side of said support shaft for generating a braking hydraulic pressure according to a rotational operation of said brake pedal;
   a support plate mounted on a vehicle body of said vehicle;
   a foot step provided on said support plate; and
   an operational amount detector mechanically connected to said brake pedal and detecting how much rotational amount of said brake pedal is made by the rotational operation of said brake pedal,
   wherein said master cylinder is located above said support shaft wherein the axis of said master cylinder extends vertically, and
   said operational amount detector is located on a second side of said support shaft, and said operational amount detector is provided on said support plate.

16. The brake device according to claim 15,
   wherein the foot step extends from said support plate, and
   said operational amount detector is provided on a lateral inside of said support plate.

17. The brake device according to claim 16,
   wherein said operational amount detector is a potentiometer, and
   said support plate has a lower extending portion projecting downward from the lowermost end of said potentiometer.

18. The brake device according to claim 17,
   wherein said support plate has an upper extending portion, and
   said master cylinder is mounted on said upper extending portion of said support plate.

19. The brake device according to claim 16,
   wherein said support plate has an upper extending portion, and
   said master cylinder is mounted on said upper extending portion of said support plate.

20. A brake device comprising:
   a support shaft;
   a brake pedal operatively mounted relative to said support shaft;
   a master cylinder located on a first side of said support shaft for generating a braking hydraulic pressure according to a rotational operation of said brake pedal;
   an operational amount detector mechanically connected to said brake pedal for detecting the rotational amount of said brake pedal; and
   a support plate,
   wherein
      said master cylinder is located above said support shaft wherein the axis of said master cylinder extends vertically,
      said operational amount detector is located on a second side of said support shaft,
      a foot step is provided on said support plate to extend from said support plate,
      said operational amount detector is provided on the lateral inside of said support plate
      said operational amount detector is a potentiometer,
      said support plate has a lower extending portion projecting downward from the lowermost end of said potentiometer,
      said support shaft is supported on said support plate,
      a boss portion of said brake pedal is rotatably mounted on said support shaft,
      a first gear extends from said boss portion along the laterally inside surface of said support plate,
      a second gear meshing with said first gear is connected to an input shaft of said potentiometer, and
      an inner cover for covering said first gear and said second gear is mounted on the laterally inside surface of said support plate.

* * * * *